US009569669B2

United States Patent
Kritt et al.

(10) Patent No.: US 9,569,669 B2
(45) Date of Patent: Feb. 14, 2017

(54) CENTRALIZED VIDEO SURVEILLANCE DATA IN HEAD MOUNTED DEVICE

(71) Applicant: International Business Machines Corporation, Armonk, NY (US)

(72) Inventors: Barry Alan Kritt, Raleigh, NC (US); Sarbajit Kumar Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 480 days.

(21) Appl. No.: 14/092,767

(22) Filed: Nov. 27, 2013

(65) Prior Publication Data
US 2015/0146004 A1    May 28, 2015

(51) Int. Cl.
*H04N 7/18*    (2006.01)
*G06K 9/00*    (2006.01)
*G02B 27/01*   (2006.01)

(52) U.S. Cl.
CPC ......... *G06K 9/00671* (2013.01); *G02B 27/017* (2013.01); *G06K 9/00771* (2013.01);
(Continued)

(58) Field of Classification Search
CPC ................................ H04N 7/181; H04N 7/183
(Continued)

(56) References Cited

U.S. PATENT DOCUMENTS

| 8,115,768 B2 | 2/2012 | Sroka et al. |
| 2007/0182812 A1 | 8/2007 | Ritchey |

(Continued)

FOREIGN PATENT DOCUMENTS

| EP | 1418458 A1 | 12/2004 |
| WO | 9600406 A1 | 1/1996 |

(Continued)

OTHER PUBLICATIONS

Schiavone et al., Multimodal Ecological Technology: From Child's Social Behavior Assessment to Child-Robot Interaction Improvement, http://www.esa.int/gsp/ACT/doc/BNG/ACT-RPR-NG-2010MultimodalEcologicalTechnology .pdf, Sep. 17, 2010.
(Continued)

*Primary Examiner* — Chikaodili E Anyikire
(74) *Attorney, Agent, or Firm* — Kunzler Law Group; Damion Josephs (57) ABSTRACT

An apparatus includes a security location module that tracks a location of a user. The user has a heads-up display with a display that allows viewing by the user of items along with electronic display images. An object identification module identifies an object for tracking using cameras. A selection module selects the identified object for tracking, an object location module identifies a location and direction information of the selected object and an alert module sends the location and the direction information of the selected object to the heads-up display. A display module identifies the selected object in the heads-up display of the user when the object is in the field of view of the heads-up display, or provides instruction on the heads-up display to direct the user to move the heads-up display so that the selected object is in the field of view of the heads-up display.

20 Claims, 5 Drawing Sheets

(52) U.S. Cl.
CPC ..... *H04N 7/181* (2013.01); *G02B 2027/0141* (2013.01); *G02B 2027/0198* (2013.01)

(58) Field of Classification Search
USPC .................................................. 348/143, 159
See application file for complete search history.

(56) References Cited

U.S. PATENT DOCUMENTS

| | | | |
|---|---|---|---|
| 2008/0024594 A1 | 1/2008 | Ritchey | |
| 2009/0251482 A1 | 10/2009 | Kondo et al. | |
| 2010/0240988 A1 | 9/2010 | Varga et al. | |
| 2010/0292871 A1* | 11/2010 | Schultz | G01C 21/00 701/3 |
| 2011/0109747 A1 | 5/2011 | Forrester et al. | |
| 2011/0291918 A1 | 12/2011 | Surber et al. | |
| 2012/0075168 A1* | 3/2012 | Osterhout | G02B 27/017 345/8 |
| 2013/0073775 A1* | 3/2013 | Wade | H04N 7/181 710/316 |
| 2013/0141312 A1 | 6/2013 | Horberg et al. | |
| 2013/0187834 A1 | 7/2013 | Nohara | |

FOREIGN PATENT DOCUMENTS

| | | |
|---|---|---|
| WO | 9813721 A1 | 4/1998 |
| WO | 0137588 A1 | 5/2001 |

OTHER PUBLICATIONS

Alberto Cammozzo, Facing Facism, http://www.academia.edu/3113809/Facing_Facism._Unique_biometric_identifiers_and_data_totalitarianism_socio-technical_considerations, Mar. 18, 2013.

Giancarlo Iannizzotto et al., A multimodal perceptual user interface for video-surveillance environments, http://dl.acm.org/citation.cfm?doid=1088463.1088475, 2005.

Google, Truth Deficit—Google Glasses, http://truthdeficit.com/google-glasses/, Mar. 22, 2013.

Patently Apple, Google Glass: Orwellian Surveillance with Fluffier Branding, http://www.patentlyapple.com/patently-apple/2013/03/google-glass-orwellian-surveillance-with-fluffier-branding.html, Mar. 19, 2013.

Nanowerk, Swedish engineers launch hackable mini-drone (w/video), http://www.nanowerk.com/news2/gadget/newsid=29120.php, Feb. 19, 2013.

* cited by examiner

CENTRALIZED VIDEO SURVEILLANCE DATA IN HEAD MOUNTED DEVICE

FIELD

The subject matter disclosed herein relates to video surveillance and more particularly relates to identifying a selected object in a heads-up display.

BACKGROUND

Surveillance systems have progressed in recent years with improvements in technology. Some surveillance systems are designed for security personnel to identify an object, such as people, vehicles, and other things that may pose a threat to safety and security of people and property in an area under surveillance. Surveillance systems have progressed in recent years with improvements in technology. However, current systems still lack an ability to easily identify an object and pass the information to security information in the field.

BRIEF SUMMARY

An apparatus for surveillance is included. A method and system perform the functions of the apparatus. The apparatus, in one embodiment, includes a security location module that tracks a location of a user. The user has a heads-up display and the heads-up display includes a display that allows viewing by the user of items in the field of view of the user along with electronic display images in the field of view of the user. The apparatus, in one embodiment, includes an object identification module that identifies an object for tracking. The object is identified using one or more cameras of a video surveillance system. The apparatus, in some embodiments, includes a selection module that selects the identified object for tracking, an object location module that identifies a location and direction information of the selected object, and/or an alert module that sends the location and the direction information of the selected object to the heads-up display. The apparatus includes, in one embodiment, a display module. The display module identifies the selected object in the heads-up display of the user when the object is in the field of view of the heads-up display, or provides instruction on the heads-up display to direct the user to move the heads-up display so that the selected object is in the field of view of the heads-up display.

In one embodiment, the display module identifies the selected object in the heads-up display by locating a symbol on an image of the selected object visible in the heads-up display and/or a location on the heads-up display corresponding to a direction of the selected object where the selected object is not visible due to an obstruction between the selected object and the heads-up display. In a further embodiment, the display module identifies the selected object in the heads-up display as a location on the heads-up display corresponding to a direction of the selected object where the selected object is not visible due to other obstructions between the selected object and the heads-up display and tracks the selected object until the selected object is in view of the user through the heads-up display. In another embodiment, the display module identifies the selected object in the heads-up display by an icon, a symbol, and/or a color change.

In one embodiment, the display module includes an object information module that displays information about the selected object along with identification of the selected object by the display module. In various embodiments, the information about the selected object may include a description of the selected object, an indication of direction of the selected object and/or an indication of speed of the selected object. In another embodiment, where the object is a person, the apparatus may include a recognition module that uses an image of the person acquired by the one or more cameras to determine an identity of the person. The object information module displays identity information in the heads-up display in addition to identifying the selected object in the heads-up display. In a further embodiment, the identify information may include a picture of the person, a name of the person, and/or a description of the person.

In one embodiment, the one or more cameras of the video surveillance system include cameras each mounted at a fixed location with a camera display, from each camera, located in a central location. In another embodiment, the selection module selects the identified object for tracking by receiving input from a user to select the identified object. In another embodiment, the one or more cameras of the video surveillance system include one or more cameras mounted on the heads-up display of one or more users different than the heads-up display where the alert module sends the location and direction information of the selected object. In another embodiment, the display module tracks movement of the selected object and adjusts identification of the selected object in the heads-up display to continually track the selected object and/or updates instruction of the heads-up display to direct the user regarding movement of the heads-up display so the selected object is in the field of view of the heads-up display. In another embodiment, the alert module sends the location and direction information of the selected object to two or more heads-up displays.

A method for surveillance includes tracking a location of a user. The user has a heads-up display and the heads-up display includes a display that allows viewing by the user of items in the field of view of the user along with electronic display images in the field of view of the user. The method includes, in some embodiments, identifying an object for tracking, where the object identified using one or more cameras of a video surveillance system, selecting the identified object for tracking, identifying a location and direction information of the selected object, and sending the location and the direction information of the selected object to the heads-up display. The method includes identifying the selected object in the heads-up display of the user when the object is in the field of view of the heads-up display, or providing instruction on the heads-up display to direct the user to move the heads-up display so that the selected object is in the field of view of the heads-up display.

In one embodiment, the method includes displaying information about the selected object along with identification of the selected object. In another embodiment, the object is a person and the method includes using an image of the person acquired by the one or more cameras to determine an identity of the person and the identity information is displayed in the heads-up display in addition to identifying the selected object in the heads-up display. In another embodiment, identifying the selected object in the heads-up display includes locating a symbol in the heads-up display on an image of the selected object visible in the heads-up display and/or a location on the heads-up display corresponding to a direction of the selected object where the selected object is not visible due to other obstructions between the selected object and the heads-up display. In another embodiment, the method includes receiving input from a user to select the identified object.

A surveillance system includes one or more cameras and a heads-up display on a user. The heads-up display includes a display that allows viewing by the user of items in the field of view of the user along with electronic display images in the field of view of the user. The system includes, in one embodiment, a security location module that tracks a location of the user and an object identification module that identifies an object for tracking. The object is identified using the one or more cameras. The system includes, in one embodiment, a selection module that selects the identified object for tracking, an object location module that identifies a location and direction information of the selected object, and an alert module that sends the location and the direction information of the selected object to the heads-up display. The system includes a display module that identifies the selected object in the heads-up display of the user when the object is in the field of view of the heads-up display or provides instruction on the heads-up display to direct the user to move the heads-up display so that the selected object is in the field of view of the heads-up display. The system may include electronic displays that display images captured by the one or more cameras, a server that communicates with the one or more cameras and the heads-up display, and/or a wireless network in communication with the heads-up display.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 1:
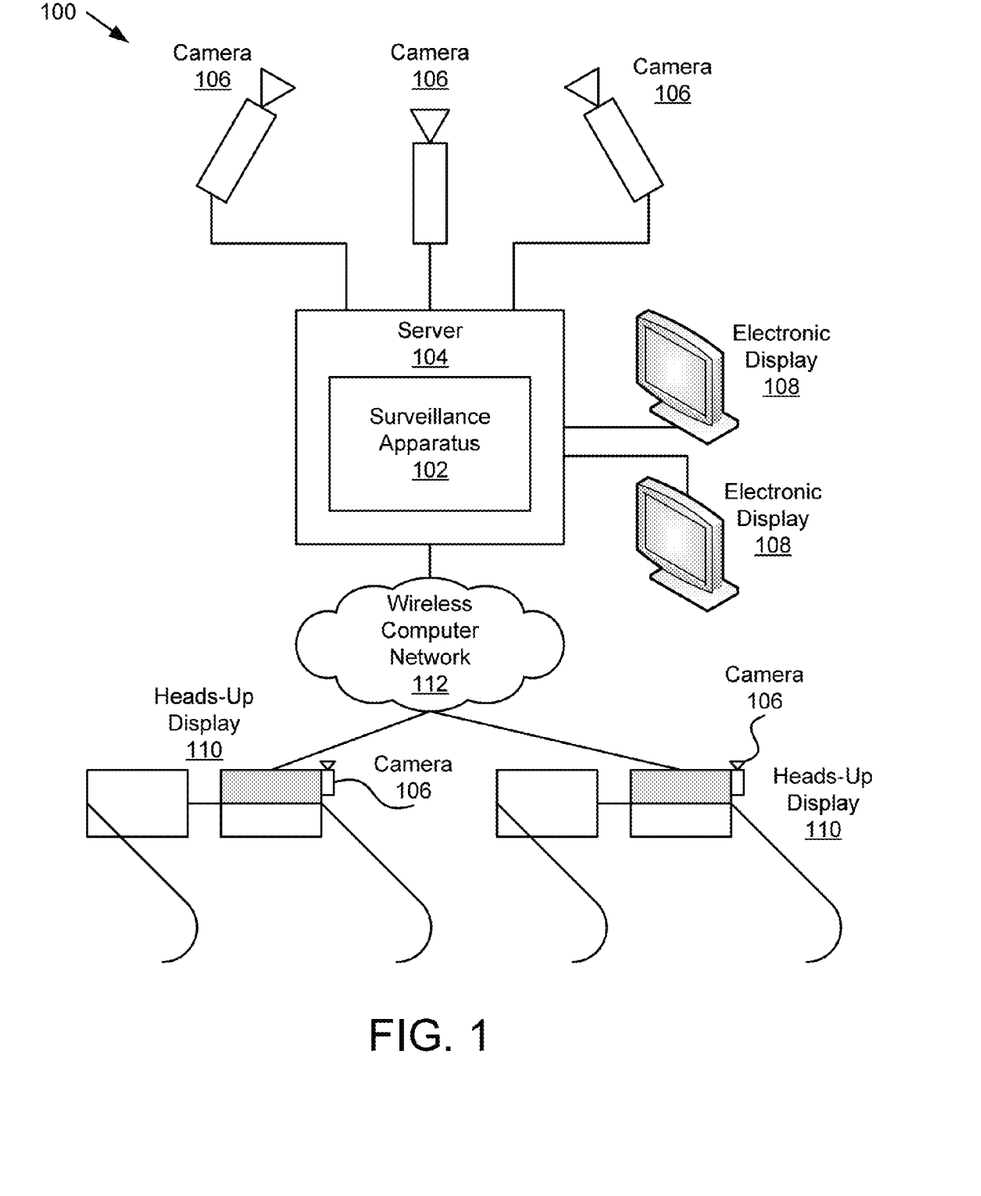
FIG. 1 is a schematic block diagram illustrating one embodiment of a system for video surveillance in accordance with one embodiment of the present invention.

FIG. 1 is a schematic block diagram illustrating one embodiment of a system 100 for video surveillance in accordance with one embodiment of the present invention. The system 100 includes a surveillance apparatus 102, a server 104, cameras 106, electronic displays 108, heads-up displays 110, and a wireless computer network 112, which are described below.

In one embodiment, the system 100 includes a surveillance apparatus 102. The surveillance apparatus 102 may be in the server 104 as shown or may be distributed where some modules, parts, etc. may be in other components of the system 100, such as the heads-up displays 110, cameras 106, other computers (not shown), other surveillance equipment (not shown), etc. The surveillance apparatus 102 is described in more detail with regard to the apparatus 200 of FIG. 2.

In one embodiment, the system 100 includes a server 104. The server 104 may be a dedicated computing device that may be part of a video surveillance system. In another embodiment, the system 100 includes additional computers and other video surveillance equipment. The server 104 may include a personal computer, a desktop computer, a mainframe computer, a dedicated head-end video surveillance computer, a laptop computer, a terminal, a rack of video surveillance equipment, or other video surveillance equipment known to those of skill in the art. The server 104 may include any computing and/or electronic equipment that is part of a video surveillance system.

In another embodiment, the system 100 includes one or more cameras 106. The cameras 106 may be mounted at a fixed location or may be mobile, such as part of a heads-up display 110. In one embodiment, the cameras 106 are mounted at various locations within a surveillance area, such as on buildings, in stairwells, in corridors, in offices, on a pole, or other locations known to those of skill in the art. In one embodiment, one or more cameras 106 are fixed such that they have a fixed field of view. In another embodiment, one or more cameras 106 have movement functions such as pan, tilt, and zoom. In another embodiment, a camera 106 may be integral with a heads-up display 110. In another embodiment, a camera 106 may be operated by a user, such as a person with a heads-up display 110, but separate from the heads-up display 110. For example, the heads-up display 110 may be in the form of eye glasses and the camera 106 may be mounted on a hat of the user. In one embodiment, a camera 106 may include various functions, such as video capture, low-light video capture, infrared video capture, sound capture, etc. One of skill in the art will recognize other forms and functions of a camera 106 useful in the system 100.

In one embodiment, the system 100 includes one or more electronic displays 108. For example, the electronic displays 108 may be located in a central video surveillance room and may be available for security personnel to view video captured by the cameras 106. In one embodiment, an electronic display 108 may include video captured by one camera 106 and in another embodiment, an electronic display 108 may include video captured by two or more cameras 106, such as on a split screen display. One of skill in the art will recognize other uses and locations of electronic displays 108 within the system 100.

In another embodiment, the system 100 includes one or more heads-up displays 110. A heads-up display 110, in one embodiment, includes a display that allows viewing by the user of items in the field of view of the user along with electronic display images in the field of view of the user. For example, the heads-up display 110 may be in the form of eye glasses, goggles, a visor, a hand-held viewer, a windshield for a vehicle, such as a car or motorcycle, etc. One example of a heads-up display 110 is Google Glass® by Google®. In one embodiment, the heads-up display 110 includes the transparent display where data is displayed so a user does not have to look away from the user's usual viewpoints. In another embodiment, the heads-up display 110 is an electronic display that combines images of the items in the field of view of the user with electronic display images in the field of view of the user. For example, the heads-up display may include a camera that transmits images of items in the field of view of the user to the electronic display. In addition, electronic display images, such as text, icons, symbols, etc. may be overlaid on the electronic display and may be in, around, and on top of the items in the field of view of the user that are on the electronic display. For example, the heads-up display 110 may be an augmented reality device or similar device. In another example, the heads-up display 110 may include night-vision goggles or similar device and electronic data maybe overlaid with the night vision display.

In one embodiment, the heads-up display 110 includes a display for one eye. In another embodiment, the heads-up display 110 includes a display for both eyes. The heads-up display 110 may include data in the form of symbols, icons, pictures, text or any other data available on an electronic display. In one embodiment, the data displayed on the heads-up display 110 is configured to be compatible with viewing such that the data has a degree of transparency, is small, etc. to allow the user to view the data with minimal distraction and/or blockage of the user's view.

In another embodiment, the data displayed on the heads-up display 110 is updated over time. For example, the surveillance apparatus 102 may send data to the heads-up display 110. In another embodiment, data is send to the heads-up display 110 from other sources. For example, some data displayed on the heads-up display 110 may be sent from the server 104 while some data displayed on the heads-up display 110 may be generated by a device residing with the user, such as from a smartphone, from sensors that sense the user's speed, direction, location, etc., from the heads-up display 110, etc. One of skill in the art will recognize other ways that the heads-up display 110 may display data.

The heads up display 110, in various embodiments, may include a processor, a wireless transmitter, video processing components, communication components, and other hardware and/or software. In one embodiment, a portion of the surveillance apparatus 102 resides on the heads-up display 110.

In one embodiment, the system 100 includes a wireless computer network 112. The wireless computer network 112, in one embodiment, provides communication between the server 104 and the heads-up displays 110. In another embodiment, the wireless computer network 112 provides communication between the server 104 and one or more cameras 106. For example, the wireless computer network 112 may provide communication between the server 104 and cameras 106 that are on the heads-up displays 110 or with a user that has a heads-up display 110. In another example, the wireless computer network 112 provides communication between the server 104 and cameras 106 that are mounted. The wireless computer network 112 may include a wireless router, cabling to the wireless router, and other equipment known to those of skill in the art.

Figure 2:
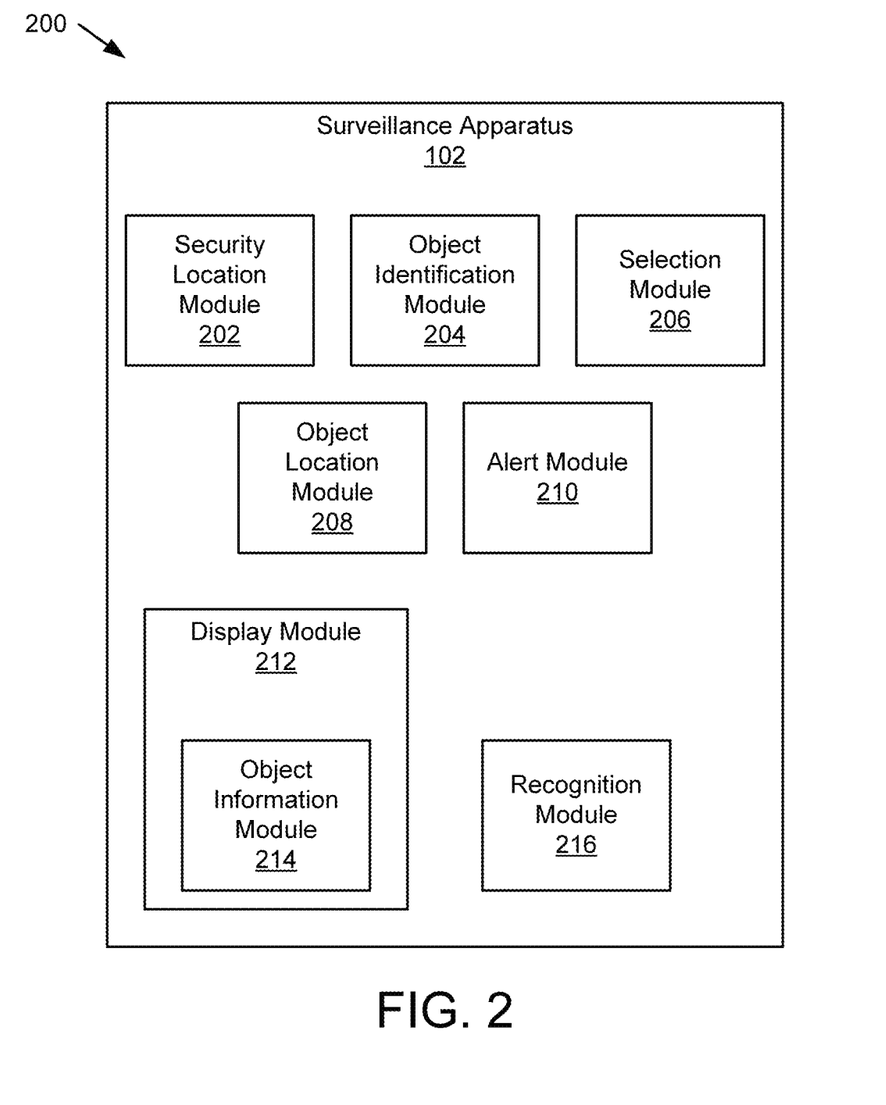
FIG. 2 is a schematic block diagram illustrating one embodiment of an apparatus for video surveillance in accordance with one embodiment of the present invention.

FIG. 2 is a schematic block diagram illustrating one embodiment of an apparatus 200 for video surveillance in accordance with one embodiment of the present invention. The apparatus 200 includes one embodiment of a surveillance apparatus 102 with a security location module 202, an object identification module 204, a selection module 206, an object location module 208, an alert module 210, a display module 212 with an object information module 214, and a recognition module 216, which are described below.

In one embodiment, the apparatus 200 includes a security location module 202 that tracks a location of a user where the user has a heads-up display 110. The heads-up display 110 includes a display that allows viewing by the user of items in the field of view of the user along with electronic display images in the field of view of the user, as described above. In one embodiment, the security location module 202 tracks the user using the wireless computer network 112.

Typically the security location module 202 tracks a location of the user. For example, the security location module 202 may track the user using a global positioning satellite ("GPS") system. In the example, the heads-up display 110 or other device with the user may include a GPS receiver and the security location module 202 may use the GPS information to identify a location of the user. In another example, the security location module 202 may use one or more of the cameras 106 to determine a location of the user. For instance, the cameras 106 may use distance measurements, triangulation, radar, or other location identification techniques to identify the location of the user. In another embodiment, the security location module 202 may use triangulation to determine a location of a user, for example by tracking a communication device, such as a cell phone or the heads-up display 110 carried by the user. One of skill in the art will recognize other ways for the security location module 202 to track a location of the user.

In one embodiment, the apparatus 200 includes an object identification module 204 that identifies an object for tracking. In one example, the object is identified using one or more of the cameras 106 of the system 100. In one example, the object identification module 204 by displaying video on an electronic display 108 to a person watching an electronic display 108 can see and identify the object. In another embodiment, the object identification module 204 identifies an object from an image from a camera 106 that is with a user, such as a camera in a heads-up display 110, a camera on a helmet, etc.

The object, in one embodiment is a person. In another embodiment, the object is an animal. In another embodiment, the object is a thing such as a vehicle, a structure, etc. For example, when the object is a person, the person may be doing something to catch the attention of security personnel monitoring the electronic displays 108. The person may be doing something suspicious, may be committing a crime, etc. In another embodiment, where the object is an animal, security personnel may determine that the animal is dangerous, is in a location where the animal could do damage, etc. In another example, where the object is a thing, the object identification module 204 may display a problem, such as a fire, a vehicle in a location where the vehicle does not belong, and the like.

In one embodiment, the object identification module 204 identifies an object of interest without a security person. For example, the object identification module 204 may identify movement of an object in a location where the object does not belong. The object identification module 204 may use motion sensors, light sensors, computer programs, or other sensors to identify the object. The object identification module 204 may identify a particular pattern and may identify the object based on deviation from the pattern or if the object follows the pattern. In one embodiment, the object identification module 204 identifies an object on a display so that security personnel can notice the object. For example, the object identification module 204 may highlight the object on an electronic display 108 for security personnel to make further identification. One of skill in the art will recognize other ways that the object identification module 204 may identify an object for tracking.

In one embodiment, the apparatus 200 includes a selection module 206 that selects the identified object for tracking. In one embodiment, the selection module 206 automatically selects the object identified by the object identification module 204. In another embodiment, the selection module 206 selects the object for tracking by receiving input from a user to select the identified object. For example, the user may be a security person viewing the object on an electronic display 108. The user may move a cursor over the object and select the object, for example. The selection module 206 may then highlight the selected object. For example, the selection module 206 may highlight the selected object with a symbol, such as a vertical line intersecting a horizontal line in the form of crosshairs, or a circle. In another example, the selection module 206 may highlight the selected object by changing color of the object or area surrounding the object.

In one embodiment, a security person at the electronic displays 108 receives an image from the object identification module 204 through the camera 106 of another user, for example with a heads-up display 110 or helmet mounted camera. In another embodiment, a security person at the electronic displays 108 receives an image from the object identification module 204 through a mounted camera 106. In another embodiment, a user with a camera 106 on a heads-up display 110 provides selection information to the selection module 206. One of skill in the art will recognize other ways for the selection module 206 to highlight the object for selection.

The apparatus 200, in one embodiment, includes an object location module 208 that identifies a location and direction information of the selected object. For example, the object location module 208 may use two or more cameras 106 with the selected object in the field of view of each camera 106, location of the cameras 106, location of the selected object within the field of view, etc. to determine a location of the selected object. In another embodiment, the object location module 208 may use known coordinates of objects near the selected object to identify a location of the selected object. In another embodiment, the object location module 208 receives location information from a user to select the location of the selected object. In another embodiment, the object location module 208 uses radar, lasers, or other electronic means to determine a location of the selected object. One of skill in the art will recognize other ways for the object location module 208 to determine a location of the selected object.

The object location module 208 may also determine a direction of travel of the selected object. In one embodiment, the selected object is not moving and the object location module 208 determines that there is no direction of the object is and the selected object is stationary. In one embodiment, the object location module 208 associates a location of the selected object with a direction of the selected object.

The object location module 208 may determine a location of the selected object in convenient units, such as geo-coordinates, a grid of the area under surveillance, etc. The object location module 208 may also determine a direction of the selected object in terms of a compass reading and direction in mile/hour, kilometers/hour, a direction vector, or other convenient means of expressing direction.

The apparatus 200, in one embodiment, includes an alert module 210 that sends the location and the direction information of the selected object to the heads-up display 110. For example, the alert module 210 may send the location and direction information over the wireless computer network 112. The location and direction information may be communicated over a closed network, over a cellular network, over a WiFi network, or the like. The alert module 210 may also send other information with the location and direction information, such as instructions, data header information, details about the selected object, where the alert came from, etc.

The apparatus 200, in another embodiment, includes a display module 212 that identifies the selected object in the heads-up display 110 of the user when the object is in the field of view of the heads-up display 110. The display module 212 may also provide instruction on the heads-up display 110 to direct the user to move the heads-up display 110 so that the selected object is in the field of view of the heads-up display 110. For example, if the selected object is in the field of view of the heads-up display 110, the display module 212 may use the location and direction information to highlight the selected object in the heads-up display 110. The display module 212 may identify the selected object using an icon, a symbol, a color change, etc. For example, the display module 212 may use crosshairs to identify the selected object as mentioned above for the selection module 206.

In a case where the selected object is not in the field of view of the heads-up display 110 at the time the alert module 210 sends the location and direction information of the selected object, the display module 212 may provide some type of instruction to the user to bring the selected object into the field of view of the heads-up display 110. For example, the display module 212 may display an arrow at the left edge of the display of the heads-up display 110 indicating to the user to turn the user's head left. The display module 212 may also display written instructions or other indicators to direct the user. For example, the display module 212 may include "turn head left 10 degrees" along with an arrow at the left edge of the display of the heads-up display 110.

In another embodiment, the display module 212 may also include audible instructions to the user. For example the alert module 210 may include audio instructions generated by the alert module 210 or from security personnel at the electronic displays 108 and the display module 212 may communicate the instructions to the user. In one embodiment, the apparatus 200 and/or system 100 includes two-way communications between security personnel in a control room with the electronic displays 108, security personnel (users) wearing the heads-up display 110, etc.

In one embodiment, the display module 212 includes an indication of a location of the selected object even though the selected object is behind some other obstruction, such as a building. The display module 212 may display an icon, such as crosshairs, along a straight line from the user to the selected object so the icon appears on the object. As the selected object or the user moves, the display module 212 or other components in the apparatus 200 may track the movement of the selected object and/or user and may update a location of the icon until the selected object is in direct view of user in the field of view of the heads-up display 110.

In one embodiment, the display module 212 includes an object information module 214 that displays information about the selected object along with identification of the selected object by the display module 212. For example, the object information module 214 may display a description of the selected object, an indication of direction of the selected object, an indication of speed of the selected object, and the like. The object information module 214 may display the information adjacent to the icon, symbol, etc. used to identify the selected object or in some other location of the display of the heads-up display 110.

In one embodiment, the apparatus 200 includes a recognition module 216 that uses an image of the person acquired by the one or more cameras 106 to determine an identity of the person. For example, the recognition module 216 may use a facial recognition program to identify facial features of the person and may access a database of people to match the person to a person in the database. The object information module 214 may then display identity information in the heads-up display 110 in addition to identifying the selected object in the heads-up display 110. For example, the object information module 214 may display a photograph of the person, may display a name, a description of the person, an address, employment information, or other information associated with the identified person. One of skill in the art will recognize other ways to use images from the cameras 106 to identify a person and then to display identity information in the heads-up display 110.

Figure 3A:
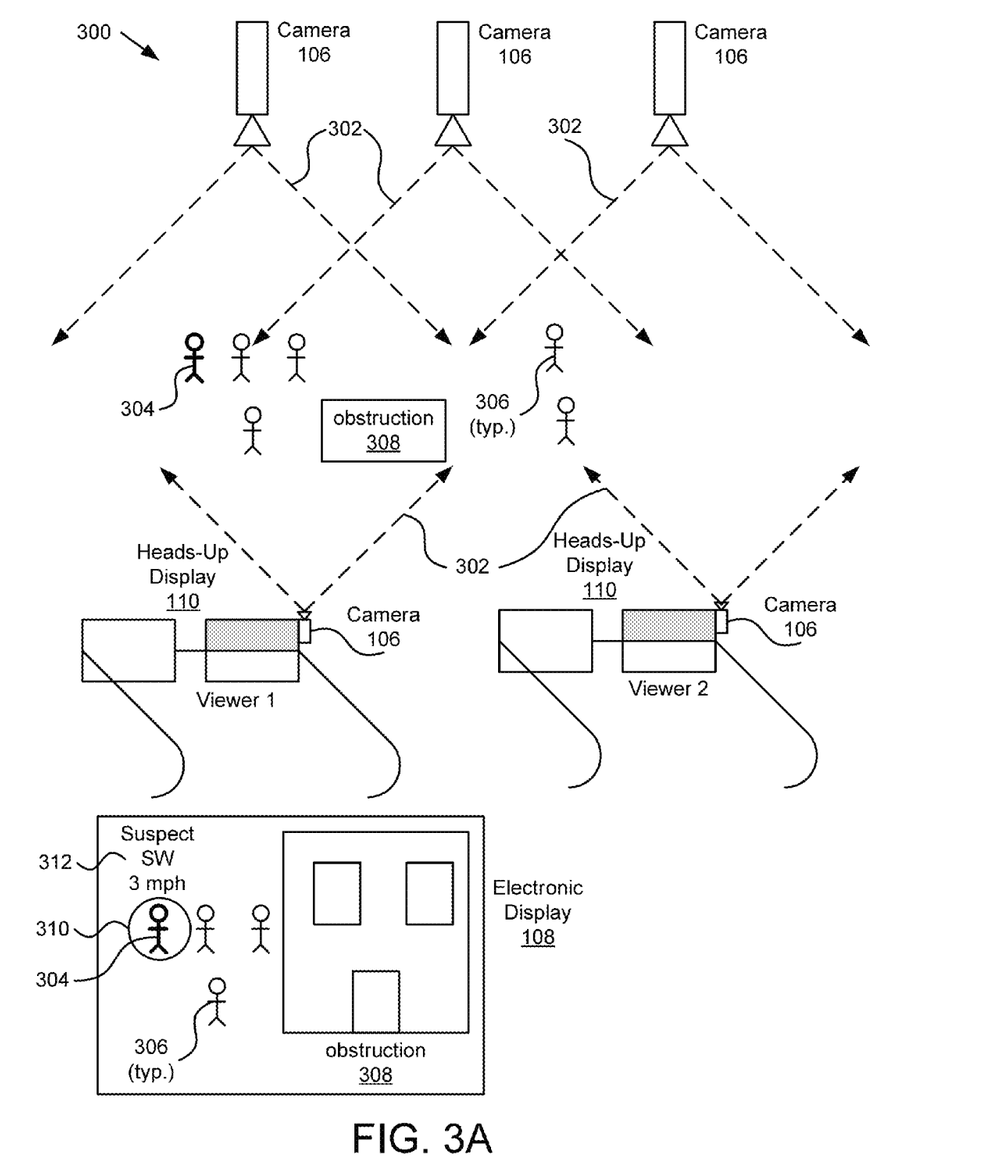
FIG. 3A is a first part of a schematic block diagram illustrating one example of using a system for video surveillance in accordance with one embodiment of the present invention.
Figure 3B:
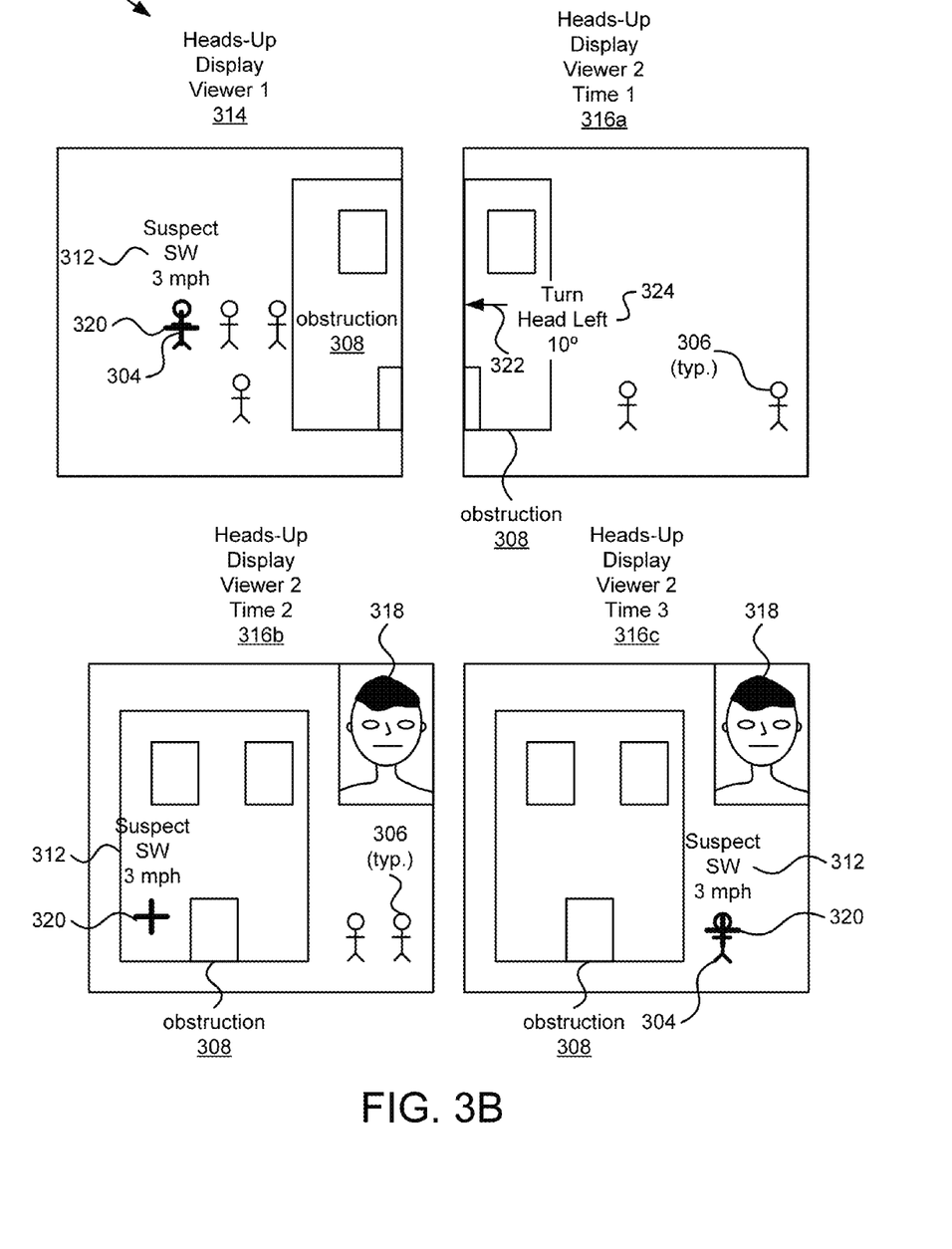
FIG. 3B is a second part of a schematic block diagram illustrating one example of using a system for video surveillance in accordance with one embodiment of the present invention.

FIGS. 3A and 3B are the first and second parts of a schematic block diagram 300 illustrating one example of using a system for video surveillance in accordance with one embodiment of the present invention. FIG. 3A depicts three fixed cameras 106 at the top of the page, each with a separate field of view 302, and two cameras 106 in heads-up displays 110, each also having a separate field of view 302. The heads-up displays 110 are depicted as eye-glass-type heads-up displays with a display that can include electronic data depicted as a gray rectangle. FIG. 3A also depicts an identified object 304 to be selected, in the form of a person, as well as other people 306 and an obstruction 308. The obstruction 308 may be a building, a vehicle, a structure, etc. that prevents one or more of the cameras 106 from having the selected object 304 in the field of view 302 of the heads-up display 110. Note that the identified object 304 is in the field of view 302 of the top left camera 106 and the bottom left camera 106. The identified object 304 is depicted as bold for clarity.

FIG. 3A also includes at the bottom a depiction of an electronic display 108 that is the video captured by a camera 106 with the identified object 304 in the field of view of the camera 106. In addition, other people 306 and the obstruction 308 are also depicted where the obstruction 308 is depicted as a building. A security person viewing the electronic display 108 may use the selection module 206 to select the identified object 304 (i.e. person). In the depicted embodiment, the selection module 206 uses a circle 310 to highlight and select the identified object 304. In addition, the object location module 208 may display information 312 associated with the selected object 304. The information 312 may be supplied by the security person or by the apparatus 200.

FIG. 3B includes a heads-up display of viewer 1 314 where viewer 1 may be a user with a heads-up display 110 that has the selected object 304 within the field of view of the heads-up display 110 when the alert module 210 sends the location and direction information of the selected object 304. In the heads-up display of viewer 1 314, the selected object 304 is identified with crosshairs 320. Information 312 is also displayed by the selected object 304 and crosshairs 320. The information 312 may be the same or different than displayed on the electronic display 108.

FIG. 3B also includes a heads-up display of viewer 2 at time 1 316a. For example, viewer 2 may be associated with the heads-up display 110 below and right of the obstruction 308 and people 306 in FIG. 3A. In the heads-up display of viewer 2 at time 1 316a, the alert module 210 may have sent the location and direction information while the viewer 2 user had the heads-up display 110 with the field of view 302 of the heads-up display facing away from the selected object 304. The heads-up display of viewer 2 at time 1 316a includes an arrow 322 and text 324 of "Turn Head Left 10°" at the left edge of the heads-up display of viewer 2 316a. The arrow 322 and text 324 provides instruction to the user to turn so that the selected object 304 is in the field of view 302 of the heads-up display of viewer 2.

FIG. 3B includes at the bottom left a heads-up display of viewer 2 at time 2 316b. At time 2, the user has turned the heads-up display 110 so that the selected object 304 is in the field of view 302 of the heads-up display 110 of viewer 2. At time 2 the obstruction 308 blocks the view of the selected obstruction 308 but the display module 212 displays crosshairs 320 where the selected object would appear without the obstruction 308. In addition, the recognition module 216 may have identified the person that is the selected object 304 and the display module 212 displays a picture 318 of the person that is the selected object 304.

FIG. 3B includes at the bottom right a heads-up display of viewer 2 at time 3 316c. At time 3, the selected object 304 and/or viewer 2 has moved so that the selected object 304 is in the field of view 302 of the heads-up display 110 of viewer 2. The selected object 304 is visible along with the crosshairs 320.

Figure 4:
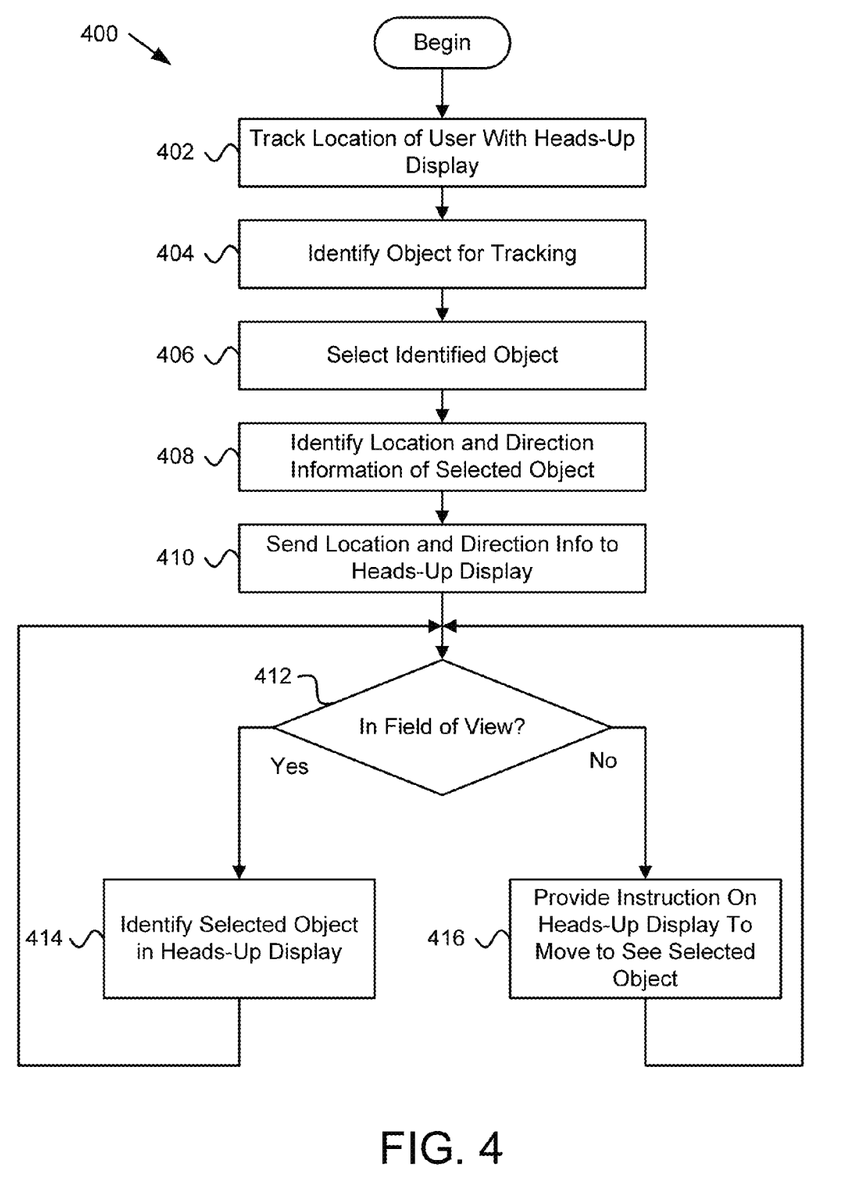
FIG. 4 is a schematic flow chart diagram illustrating one embodiment of a method for video surveillance in accordance with one embodiment of the present invention.

FIG. 4 is a schematic flow chart diagram illustrating one embodiment of a method 400 for video surveillance in accordance with one embodiment of the present invention. The method 400 begins and tracks 402 a location of a user. The user has a heads-up display 110 and the heads-up display 110 includes a display that allows viewing by the user of items in the field of view of the user along with electronic display images in the field of view of the user. In one embodiment, security location module 202 tracks the user. The method 400 identifies 404 an object for tracking, where the object is identified using one or more cameras of a video surveillance system, and selects 406 the identified object for tracking. For example, the object identification module 204 may identify the object and the selection module 206 may select the identified object. The method 400 identifies 408 a location and direction information of the selected object and sends 410 the location and the direction information of the selected object to the heads-up display 110. The object location module 208 may identify a location and direction of the selected object and the alert module 210 may send the location and direction information to the heads-up display 110.

The method 400 determines 412 if the selected object is in the field of view of the heads-up display 110. If the method 400 determines 412 that the selected object is in the field of view of the heads-up display 110, the method 400 identifies 414 the selected object in the heads-up display 110 and returns to determine 412 if the selected object is in the field of view of the heads-up display 110. If the method 400 determines 412 that the selected object is not in the field of view of the heads-up display 110, the method 400 provides 416 instruction on the heads-up display 110 to move the heads-up display 110 so that the selected object is in the field of view of the heads-up display 110, and the method 400 returns to determine 412 if the selected object is in the field of view of the heads-up display 110.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a security location module that tracks a location of a first user, the first user being ground based and having a heads-up display, the heads-up display comprising a display that allows viewing by the first user of items in the field of view of the first user along with electronic display images in the field of view of the first user;
an object identification module that identifies an object for tracking, the object identified using one or more cameras of a video surveillance system, the object for tracking being in a field of view of the one or more cameras and not in a field of view of the heads-up display;
a selection module that selects, from images captured by the one or more cameras of the video surveillance system and displayed on an electronic display other than the heads-up display, the identified object for tracking in response to selection input by a second user different than the first user;
an object location module that identifies a location and direction information of the selected object, wherein the selected object moves with respect to the first user;
an alert module that sends the location and the direction information of the selected object to the heads-up display; and
an display module that identifies the selected object in the heads-up display of the first user in response to the object being in the field of view of the heads-up display; and
provides instruction on the heads-up display, in response to the object not being in the field of view of the heads-up display, to direct the first user to move the heads-up display so that the selected object is in the field of view of the heads-up display,
wherein the security location module, the object identification module, the selection module, the object location module, the alert module, and the display module comprise one or more of hardware and executable code, the executable code stored on one or more computer readable storage media.

2. The apparatus of claim 1, wherein the display module identifies the selected object in the heads-up display by locating a symbol on one or more of
an image of the selected object visible in the heads-up display; and
a location on the heads-up display corresponding to a direction of the selected object where the selected object is not visible due to an obstruction between the selected object and the heads-up display.

3. The apparatus of claim 2, wherein the display module identifies the selected object in the heads-up display as a location on the heads-up display corresponding to a direction of the selected object where the selected object is not visible due to other obstructions between the selected object and the heads-up display and tracks the selected object until the selected object is in view of the first user through the heads-up display.

4. The apparatus of claim 1, wherein the display module identifies the selected object in the heads-up display by one or more of an icon, a symbol, and a color change.

5. The apparatus of claim 1, wherein the display module further comprises an object information module that displays information about the selected object along with identification of the selected object by the display module.

6. The apparatus of claim 5, wherein the information about the selected object comprises one or more of
a description of the selected object;
an indication of direction of the selected object; and
an indication of speed of the selected object.

7. The apparatus of claim 5, wherein the object comprises a person and further comprising a recognition module that uses an image of the person acquired by the one or more cameras to determine an identity of the person, wherein the object information module displays identity information in the heads-up display in addition to identifying the selected object in the heads-up display.

8. The apparatus of claim 7, wherein the identify information comprises one or more of a picture of the person, a name of the person, and a description of the person.

9. The apparatus of claim 1, wherein the one or more cameras of the video surveillance system comprises cameras each mounted at a fixed location with a camera display, from each camera, located in a central location.

10. The apparatus of claim 1, wherein the selection module selects the identified object for tracking by receiving input from a first user to select the identified object.

11. The apparatus of claim 1, wherein the one or more cameras of the video surveillance system comprise one or more cameras mounted on a heads-up display of one or more additional users different than both the first user and the second user, where the alert module sends the location and direction information of the selected object.

12. The apparatus of claim 1, wherein the display module tracks movement of the selected object and adjusts one or more of
identification of the selected object in the heads-up display to continually track the selected object; and
updates instruction of the heads-up display to direct the first user regarding movement of the heads-up display so the selected object is in the field of view of the heads-up display.

13. The apparatus of claim 1, wherein the alert module sends the location and direction information of the selected object to two or more heads-up displays.

14. The apparatus of claim 1, wherein the heads-up display comprises one or more of:
a transparent display that allows viewing by the first user of the items in the field of view of the first user through the transparent display along with electronic images in the field of view of the first user on the transparent display; and
an electronic display that combines images of the items in the field of view of the first user with electronic display images in the field of view of the first user.

15. A method comprising:
tracking a location of a first user, the first user having a heads-up display, the heads-up display comprising a display that allows viewing by the first user of items in the field of view of the first user along with electronic display images in the field of view of the first user;
identifying an object for tracking, the object identified using one or more cameras of a video surveillance system, the object for tracking being in a field of view of the one or more cameras and not in a field of view of the heads-up display;
selecting, from images captured by the one or more cameras of the video surveillance system and displayed on an electronic display other than the heads-up display, the identified object for tracking in response to selection input by a second user different than the first user;
identifying a location and direction information of the selected object, wherein the selected object moves with respect to the first user;
sending the location and the direction information of the selected object to the heads-up display; and
identifying the selected object in the heads-up display of the first user in response to the object being in the field of view of the heads-up display, and providing instruction on the heads-up display, in response to the selected object not being in the field of view of the heads-up display, to direct the first user to move the heads-up display so that the selected object is in the field of view of the heads-up display.

16. The method of claim 15, further comprising displaying information about the selected object along with identification of the selected object.

17. The method of claim 15, wherein the object comprises a person and further comprising using an image of the person acquired by the one or more cameras to determine an identity of the person, wherein the identity information is displayed in the heads-up display in addition to identifying the selected object in the heads-up display.

18. The method of claim 15, wherein identifying the selected object in the heads-up display comprises locating a symbol in the heads-up display on one or more of
an image of the selected object visible in the heads-up display; and
a location on the heads-up display corresponding to a direction of the selected object where the selected object is not visible due to other obstructions between the selected object and the heads-up display.

19. A system comprising:
one or more cameras;
a heads-up display on a first user, the heads-up display comprising a display that allows viewing by the first user of items in the field of view of the first user along with electronic display images in the field of view of the first user;
a security location module that tracks a location of the first user;
an object identification module that identifies an object for tracking, the object identified using the one or more cameras, the object for tracking being in a field of view of the one or more cameras and not in a field of view of the heads-up display;
a selection module that selects, from images captured by the one or more cameras of the video surveillance system and displayed on an electronic display other than the heads-up display, the identified object for tracking in response to selection input by a second user different than the first user;
an object location module that identifies a location and direction information of the selected object, wherein the selected object moves with respect to the first user;

an alert module that sends the location and the direction information of the selected object to the heads-up display; and a display module that identifies the selected object in the heads-up display of the first user in response to the object being in the field of view of the heads-up display; and provides instruction on the heads-up display, in response to the selected object not being in the field of view of the heads-up display, to direct the first user to move the heads-up display so that the selected object is in the field of view of the heads-up display.

20. The system of claim 19, further comprising one or more of electronic displays that display images captured by the one or more cameras;

a server that communicates with the one or more cameras and the heads-up display; and a wireless network in communication with the heads-up display.

* * * * *